US011074742B2

(12) United States Patent
Matsushita et al.

(10) Patent No.: US 11,074,742 B2
(45) Date of Patent: Jul. 27, 2021

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventors: Akihiro Matsushita, Tokyo (JP); Kiwamu Kobayashi, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/594,397

(22) Filed: Oct. 7, 2019

(65) Prior Publication Data

US 2020/0143582 A1 May 7, 2020

(30) Foreign Application Priority Data

Nov. 7, 2018 (JP) .............................. JP2018-209731

(51) Int. Cl.
*G06T 15/20* (2011.01)
*G06T 7/90* (2017.01)

(52) U.S. Cl.
CPC ................. *G06T 15/20* (2013.01); *G06T 7/90* (2017.01); *G06T 2207/10024* (2013.01)

(58) Field of Classification Search
CPC . G06T 15/20; G06T 7/90; G06T 2207/10024; G06T 7/254; G06T 2207/30228
See application file for complete search history.

(56) References Cited

U.S. PATENT DOCUMENTS

| 9,152,243 | B2 * | 10/2015 | Gu ........................ G06K 9/6242 |
| 2003/0133044 | A1 * | 7/2003 | Akiyama ................. H04N 9/75 |
| | | | 348/586 |
| 2015/0297949 | A1 * | 10/2015 | Aman ..................... G06T 7/246 |
| | | | 348/157 |

FOREIGN PATENT DOCUMENTS

JP 2014023057 A 2/2014

* cited by examiner

*Primary Examiner* — Said Broome
(74) *Attorney, Agent, or Firm* — Rossi, Kimms & McDowell LLP

(57) ABSTRACT

An image processing apparatus 200 includes: a first saturation information obtaining unit 306 configured to obtain saturation of a frame image; a second saturation information obtaining unit 309 configured to obtain saturation of a background image; and a threshold value determining unit 311 configured to determine a threshold value, which is used for checking a difference in color information, for each pixel, based on the saturation obtained by each of the first saturation information obtaining unit 306 and the second saturation information obtaining unit 309. A hue foreground area estimating unit 312 is configured to estimate a foreground area by use of the threshold value determined by the threshold value determining unit 311 as well as color information of the frame image and color information of the background image.

15 Claims, 7 Drawing Sheets

IMAGE PROCESSING APPARATUS, IMAGE PROCESSING METHOD, AND STORAGE MEDIUM

BACKGROUND

Field

The present disclosure relates to a technology for determining a foreground area from a captured image.

Description of the Related Art

Processing for determining a foreground area, such as a human figure, from a captured image is performed. Patent Laid-Open No. 2014-23057 (hereinafter referred to as Document 1) discloses a method for detecting a subject area based on a color characteristic amount such as color difference and luminance. In Document 1, there is a description about: obtaining an evaluation value, which indicates an achromatic color degree of an image; determining in accordance with the evaluation value whether to use a mask, which has been created based on each characteristic amount such as color difference and luminance; and detecting a subject area by use of a mask, which is targeted for use.

However, the technology of Document 1 is for determining whether to use a mask based on an evaluation value, which indicates an achromatic color degree of an image, and is not for adaptively changing conditions for determining whether to be a foreground in accordance with an achromatic color degree. Therefore, there is a case where a foreground area cannot be determined appropriately.

SUMMARY OF THE INVENTION

An image processing apparatus includes: a first obtaining unit configured to obtain a captured image and a background image generated based on a captured image; a second obtaining unit configured to obtain a difference in hue or a difference in chromaticity between the captured image and the background image obtained by the first obtaining unit; a third obtaining unit configured to obtain at least one of saturation of the captured image obtained by the first obtaining unit and saturation of the background image obtained by the first obtaining unit; and an estimating unit configured to estimate a foreground area by comparing a threshold value set according to the at least one of saturation obtained by the third obtaining unit with the difference in hue or the difference in chromaticity obtained by the second obtaining unit.

Further features of the present invention will become apparent from the following description of exemplary embodiments with reference to the attached drawings.

DESCRIPTION OF THE EMBODIMENTS

Figure 1:
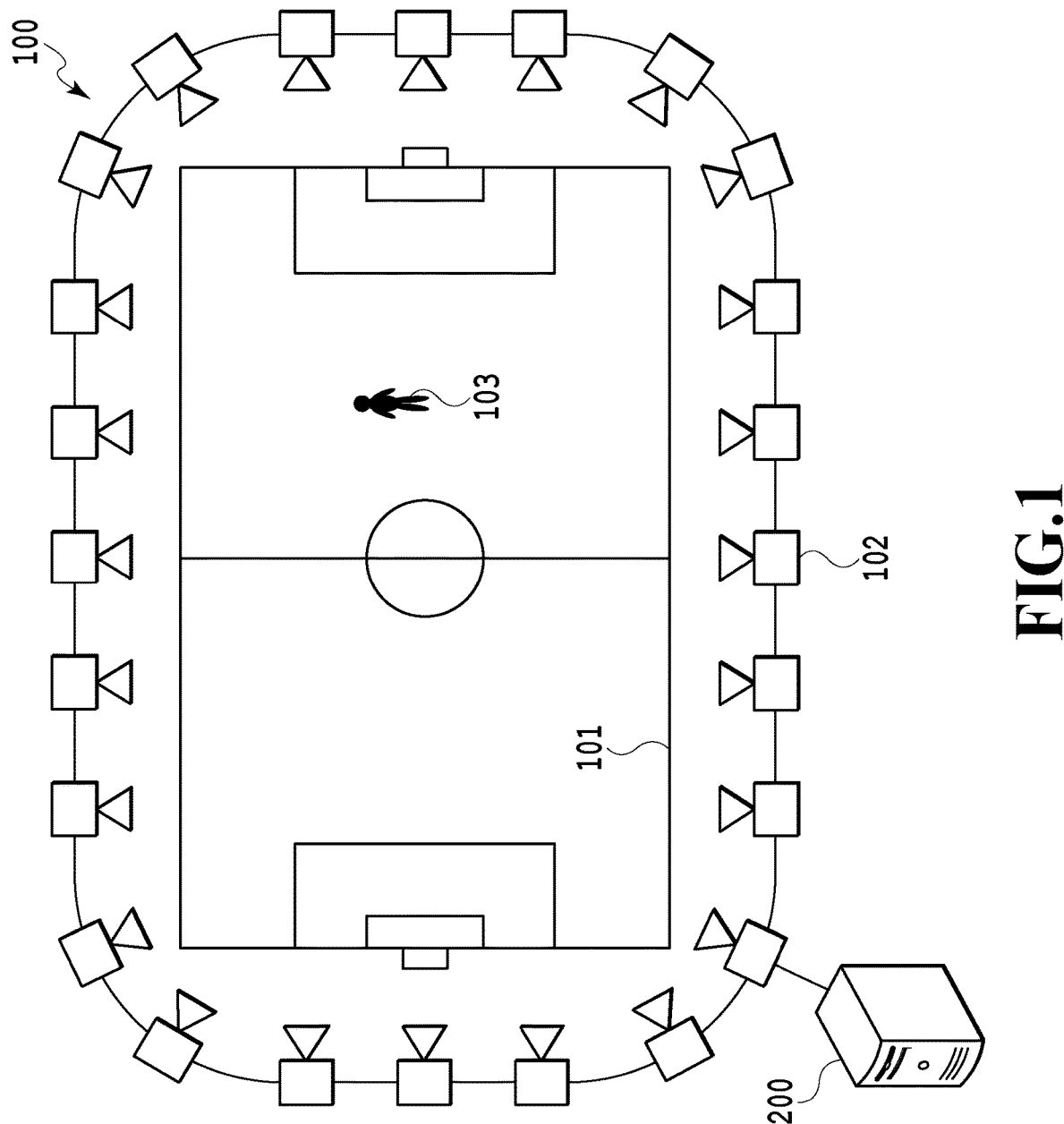
FIG. 1 is a diagram illustrating an overview of a system.

Hereinafter, a detailed explanation based on embodiments is given with reference to the accompanying drawings. The configurations shown in the following embodiments are merely examples, and the present disclosure is not limited to the illustrated configurations.

First Embodiment

In the present embodiment, an explanation is given of a mode in which a foreground area, which is used for generating a virtual viewpoint image, is determined. First, for ease of understanding of the embodiment, a brief explanation is given of an overview of a virtual viewpoint image. There is a technology of generating a virtual viewpoint image of a given virtual viewpoint by use of images of multiple viewpoints, which are captured from multiple viewpoints. For example, by use of virtual viewpoint images, highlight scenes of a soccer or basketball game can be viewed/browsed from various angles, and, therefore, it is possible to give a user a highly realistic feeling, compared to normal images.

Generation of such a virtual viewpoint image based on multi-viewpoint images is performed by collecting images captured by multiple cameras into an image processing unit of a server, or the like, and performing such a process as rendering in the image processing unit. Further, a generated virtual viewpoint image is transmitted to a user terminal so as to be browsed on the user terminal.

For generating a virtual viewpoint image, a process of modeling a foreground, which is a main subject (object), apart from a background part and then rendering the foreground is performed. Modeling of a foreground requires information of a foreground mask, which corresponds to the silhouette of the foreground seen from multiple cameras, and texture information of the foreground (such as RGB color information of each pixel of the foreground).

The process of separating a foreground from a background part is referred to as a foreground background separation process. The foreground background separation process is a process of estimating and determining a foreground area, and the process is generally performed by a background subtraction method. The background subtraction method is a method in which a difference between a background image and an input image, which includes a foreground, is obtained and the area made by a collection of pixels of which difference values have been determined to be equal to or greater than a predetermined threshold value is regarded as a foreground area.

In the estimation processing of a foreground area, it is common to obtain a difference by use of a characteristic amount of an image, such as luminance, color, or texture. Here, in the mode using a difference between characteristic amounts of color, in a case where the saturation is low, the hue accuracy decreases. This may increase erroneous determination in the estimation of a foreground area. In the embodiment explained below, an explanation is given of an example of processing of determining an appropriate foreground area, such that, in a case of estimating a foreground area by use of a difference between characteristic amounts of color, a threshold value is changed according to saturation so as to improve the accuracy of the estimation of a foreground area.

\<System Configuration\>

FIG. 1 is a diagram for explaining a schematic configuration of a system 100 of the present embodiment. There are multiple cameras 102 arranged side by side around the stadium 101, so that images of the stadium 101 are captured from multiple viewpoints. It is assumed that a competition such as a soccer game is held in the stadium 101 and that a human figure 103, which is to be a foreground object, is present in the stadium 101. An object is a specific human figure such as a player, a manager, or a referee. The object may be an object having a predetermined image pattern, such as a ball or a goal.

Each camera 102 includes input/output hardware for data transmission. The cameras 102 are connected to each other in a ring-shaped network by use of a network cable, or the like, and are configured to sequentially transmit image data to adjacent cameras via the network. That is, a camera 102 is configured to transmit received image data together with image data obtained by capturing by itself to an adjacent camera. One of the cameras 102 is connected to an image processing apparatus 200, and image data of each camera 102 is transmitted to the image processing apparatus 200. In the image processing apparatus 200, processing for generating a virtual viewpoint image is performed by use of each received image data.

\<Configuration and Processing of Image Processing Apparatus\>

Figure 2:
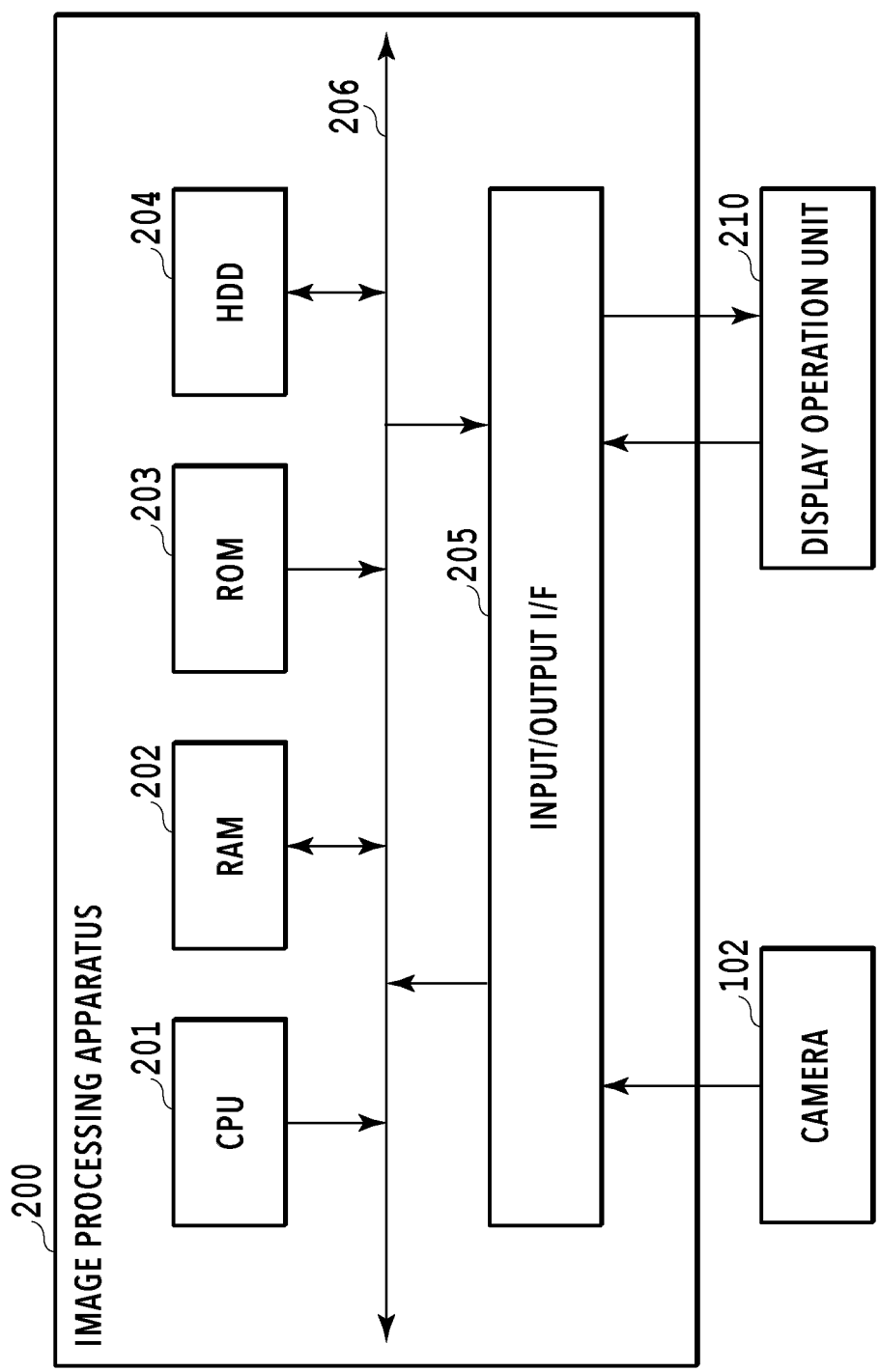
FIG. 2 is a block diagram illustrating a hardware configuration of an image processing apparatus.

FIG. 2 is a diagram illustrating an example of a hardware configuration of the image processing apparatus 200. The image processing apparatus 200 includes a CPU 201, a RAM 202, a ROM 203, an HDD 204, and an input/output I/F 205. The components of the image processing apparatus 200 are mutually connected via a system bus 206. Further, the image processing apparatus 200 is connected to a camera 102 and a display operation unit 210 via the input/output I/F 205.

The CPU 201 executes a program stored in the ROM 203, using the RAM 202 as a work memory and comprehensively controls each component of the image processing apparatus 200 via the system bus 206. In this way, the various processing described below are implemented. The HDD 204 is a high-capacity storage device that stores various kinds of data to be handled by the image processing apparatus 200, and the HDD 204 may be an SSD, for example. The CPU 201 is capable of writing data on the HDD 204 and reading data stored in the HDD 204 via the system bus 206.

The input/output I/F 205 is, for example, a serial bus I/F such as USB or IEEE 1394, and input or output of various kinds of data, commands, etc., between an external device and the image processing apparatus 200 is performed via the input/output I/F 205. The display operation unit 210 is configured with, for example, a liquid crystal display having a touch-sensitive panel function. Further, the display operation unit 210 displays necessary information for a user or obtains an instruction from a user via a UI screen. Although the image processing apparatus 200 may include more components other than those described above, explanation thereof is omitted.

Figure 3:
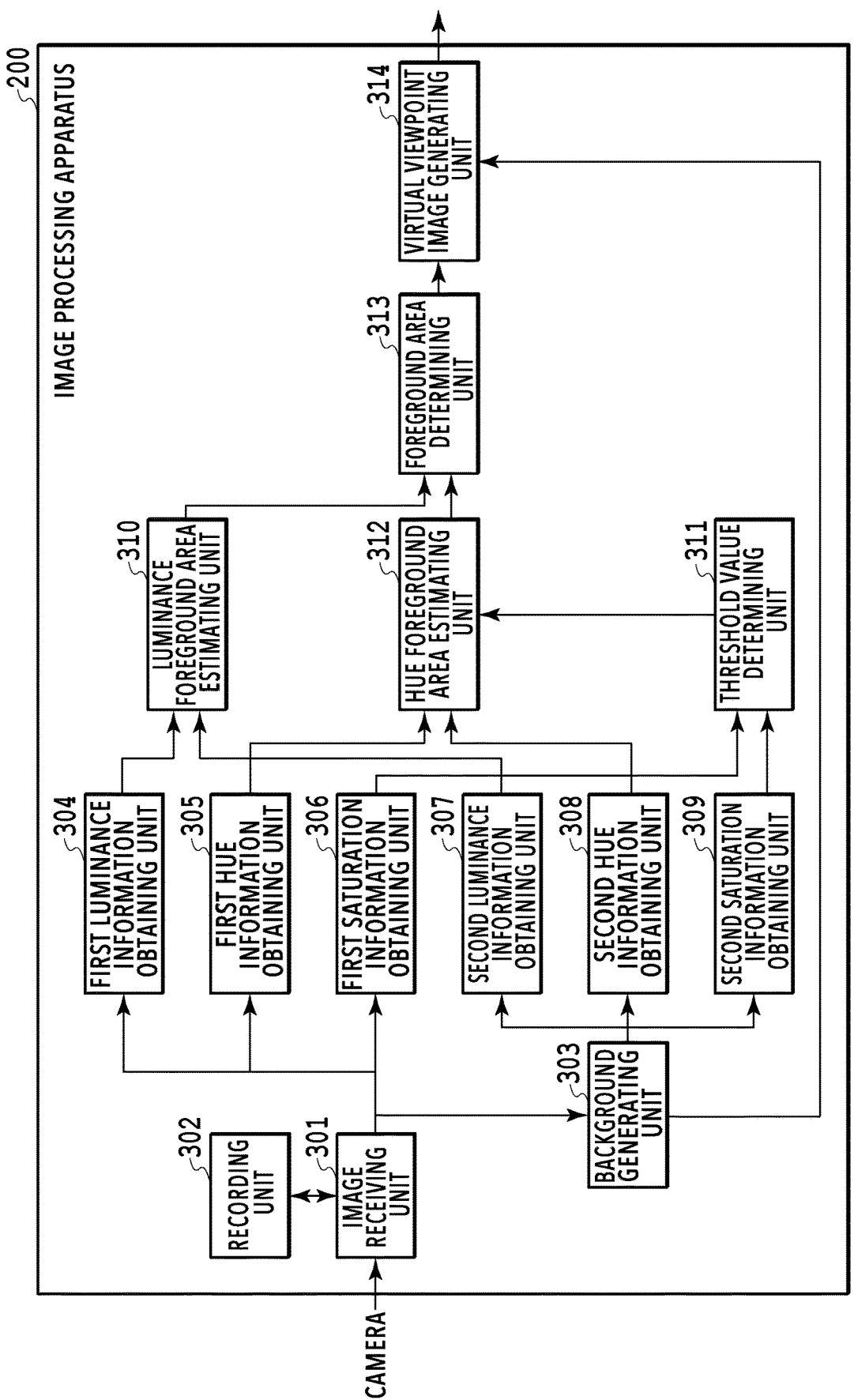
FIG. 3 is a block diagram illustrating a functional configuration of the image processing apparatus.

FIG. 3 is a block diagram illustrating a functional configuration of the image processing apparatus 200. The image processing apparatus 200 includes an image receiving unit 301, a recording unit 302, a background generating unit 303, a first luminance information obtaining unit 304, a first hue information obtaining unit 305, a first saturation information obtaining unit 306, a second luminance information obtaining unit 307, a second hue information obtaining unit 308, a second saturation information obtaining unit 309, a luminance foreground area estimating unit 310, a threshold value determining unit 311, a hue foreground area estimating unit 312, a foreground area determining unit 313, and a virtual viewpoint image generating unit 314. The recording unit 302 in FIG. 3 is realized by the HDD 204 or the RAM 202, for example. Regarding the other units of FIG. 3, the CPU 201 reads out a program stored in the ROM 203, or the like, to the RAM 202 and executes the program, so that the CPU 201 functions as each unit illustrated in FIG. 3. That is, the image processing apparatus 200 is capable of realizing each module illustrated in FIG. 3 as a software module. Alternatively, the image processing apparatus 200 may include built-in hardware such as an ASIC (application specific integrated circuit) and an FPGA (field programmable gate array), which are not illustrated in FIG. 3. Furthermore, each unit illustrated in FIG. 3 may be processed by hardware such as an ASIC and an FPGA, and each unit illustrated in FIG. 3 may be mounted inside an ASIC or an FPGA as hardware. Further, a part of FIG. 3 may be realized by software, and the rest may be realized by hardware.

Figure 4:
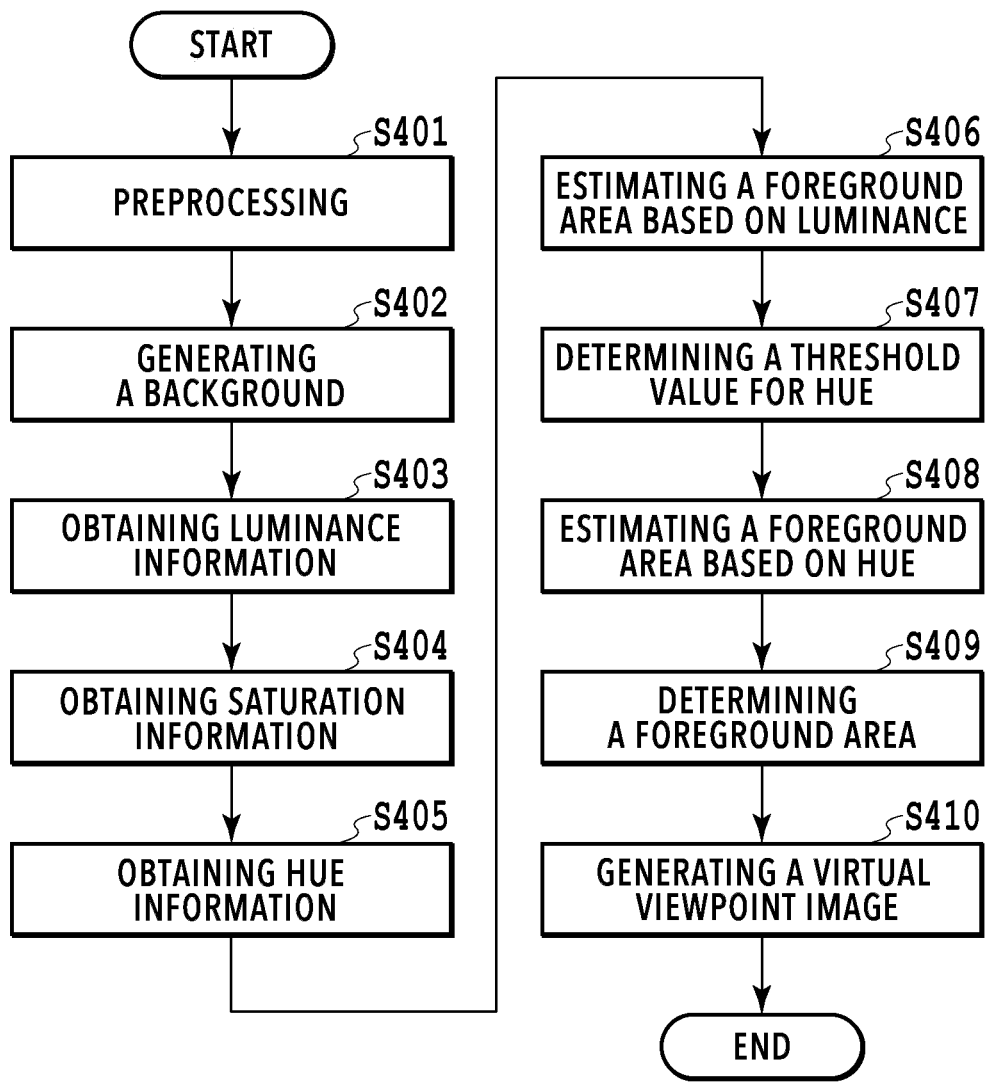
FIG. 4 is a flowchart for explaining image processing.

FIG. 4 is a diagram illustrating an example of a flowchart performed in the image processing apparatus 200. The series of processes illustrated in the flowchart of FIG. 4 is performed by the CPU 201 retrieving a program code stored in the ROM 203 or the HDD 204 into the RAM 202 and executing the program code. Alternatively, a part or all of the functions in the steps of FIG. 4 may be implemented by hardware such as an ASIC, an FPGA, or an electronic circuit. The symbol "S" in the explanation of each process means that it is a step in the flowchart. Hereinafter, an explanation is given of an overview of the configuration and the processing of the image processing apparatus 200 with reference to FIG. 2, FIG. 3, and FIG. 4.

In S401, the image processing apparatus 200 performs preprocessing. The preprocessing is processing performed prior to the foreground area determination processing performed in the present embodiment. For example, the image receiving unit 301 receives image data of each camera 102 via a network. Hereinafter, an image represented by image data received by the image receiving unit 301 is referred to as an input image. Input images are images input continuously as time passes and may include a moving image and a still image. In the present embodiment, an input image is explained as a frame image of a moving image. In S401, the image receiving unit 301 performs preprocessing, such as distortion correction of an image having a lens distortion and color and gamma adjustment, to a received input image. The image receiving unit 301 stores the preprocessed image data in the recording unit 302.

In S402, the image processing apparatus 200 performs generation processing of a background image. For example, the image processing apparatus 200 obtains information of time for generating a virtual viewpoint image through the display operation unit 210. The image receiving unit 301 sequentially reads out frame images of respective cameras corresponding to the time for generating a virtual viewpoint image from the recording unit 302. Further, the image receiving unit 301 outputs the frame images to the background generating unit 303, the first luminance information obtaining unit 304, the first hue information obtaining unit 305, and the first saturation information obtaining unit 306, respectively.

An explanation is given of the background generating unit 303. The background generating unit 303 performs processing of estimating a background image of each camera based on multiple frame images (including frame images received in the past) captured by respective cameras and storing a result thereof in a memory such as the HDD 204. For the background generation processing based on multiple frame images, a background generation method using Gaussian Mixture Model can be used, for example. Gaussian Mixture Model is a generally well-known method, and, therefore, a detail explanation thereof is omitted.

In S402, upon receiving a frame image from the image receiving unit 301, the background generating unit 303 reads out a background image stored in a memory for the corresponding camera, updates the background image by use of the received frame image, and stores the background image in the memory. In this way, a background image corresponding to a frame image is generated. The background generating unit 303 outputs the background image data of the camera corresponding to the frame image received from the image receiving unit 301 to the second luminance information obtaining unit 307, the second hue information obtaining unit 308, and the second saturation information obtaining unit 309. Further, the background generating unit 303 outputs the background image data to the virtual viewpoint image generating unit 314.

In S403, processing of obtaining luminance information is performed by the first luminance information obtaining unit 304 and the second luminance information obtaining unit 307. In the present embodiment, a frame image is an image of which each pixel is configured with RGB pixel values, and the processing of obtaining luminance information is performed by calculating luminance information from the RGB pixel values. In a case where an image to which color conversion processing has already been performed is received by the image processing apparatus 200, the luminance information of the received image may be obtained without performing the calculation process. The same applies to saturation and hue, which are described later.

First, an explanation is given of processing by the first luminance information obtaining unit 304. The first luminance information obtaining unit 304 determines luminance information of each pixel of a frame image that is output from the image receiving unit 301. In the present embodiment, processing by use of the HSV color space is performed to a frame image, which is an RGB image. The first luminance information obtaining unit 304 determines a V component, which is luminance information, by Formula (1).

$$V = \max(R, G, B) \quad \text{Formula (1)}$$

Here, "max" is a function for selecting the maximum value among arguments. The second luminance information obtaining unit 307 determines a V component, which is luminance information of each pixel of a background image that is output from the background generating unit 303, by Formula (1), as with the first luminance information obtaining unit 304. The luminance information obtained by the first luminance information obtaining unit 304 and the second luminance information obtaining unit 307 are output to the luminance foreground area estimating unit 310.

In S404, processing of obtaining saturation information is performed by the first saturation information obtaining unit 306 and the second saturation information obtaining unit 309. First, an explanation is given of processing by the first saturation information obtaining unit 306. The first saturation information obtaining unit 306 obtains saturation information of each pixel of a frame image that is output from the image receiving unit 301. The first saturation information obtaining unit 306 calculates an S component, which is saturation information, by Formula (2) as color information of each pixel.

$$S = \max(R, G, B) - \min(R, G, B) \quad \text{Formula (2)}$$

Here, "min" is a function for selecting the minimum value among arguments. The second saturation information obtaining unit 309 calculates an S component, which is saturation information of each pixel of a background image that is output from the background generating unit 303, by Formula (2), as with the first saturation information obtaining unit 306. The saturation information obtained by the first saturation information obtaining unit 306 and the second saturation information obtaining unit 309 are output to the threshold value determining unit 311.

In S405, processing of obtaining hue information is performed by the first hue information obtaining unit 305 and the second hue information obtaining unit 308. First, an explanation is given of processing by the first hue information obtaining unit 305. The first hue information obtaining unit 305 obtains hue information of each pixel of a frame image that is output from the image receiving unit 301. The first hue information obtaining unit 305 calculates an H component, which is hue information, by Formulas (3) through (5) as color information of each pixel. The value calculated by Formula (2) is used for "S".

In a case where $\min(R, G, B) = B$, $$H = (G-R)/S \times 60 + 60 \quad \text{Formula (3)}$$

In a case where $\min(R, G, B) = R$, $$H = (B-G)/S \times 60 + 180 \quad \text{Formula (4)}$$

In a case where $\min(R, G, B) = G$, $$H = (R-B)/S \times 60 + 300 \quad \text{Formula (5)}$$

In a case where $\max(R, G, B) = \min(R, G, B)$, the value of "H" is invalid. The second hue information obtaining unit 308 calculates an H component, which is hue information of each pixel of a background image that is output from the background generating unit 303, by Formulas (3) through (5), as with the first hue information obtaining unit 305. The value calculated by Formula (2) is used for "S". Further, in a case where $\max(R, G, B) = \min(R, G, B)$, the value of "H" is invalid. The hue information obtained by the first hue information obtaining unit 305 and the second hue information obtaining unit 308 are output to the hue foreground area estimating unit 312.

In S406, the luminance foreground area estimating unit 310 estimates the foreground area of the frame image by use of the luminance information of the frame image and the luminance information of the background image obtained in S403. For example, the luminance foreground area estimating unit 310 checks the difference between the V component of the frame image and the V component of the background image, and, in a case where the value thereof is greater than a predetermined threshold value, the luminance foreground area estimating unit 310 estimates that the pixel is (corresponds to) the foreground. In the present embodiment, the threshold value used by the luminance foreground area estimating unit 310 is a threshold value that is the same for every pixel. In the present embodiment, a description has been given of the example in which a V component in the HSV color space is used as luminance information. However, the present embodiment is not limited to the example Regarding luminance information, processing by use of another color space may be performed. For example, processing by use of the YUV color space may be performed. Generally, in the YUV color space, a method of calculating luminance "Y" by Formula (6) is known.

$$Y = 0.299 \times R + 0.587 \times G + 0.114 \times B \quad \text{Formula (6)}$$

Regarding calculation of luminance information, various calculation methods are known other than the above calculation method, and any calculation method may be used.

Figure 5A:
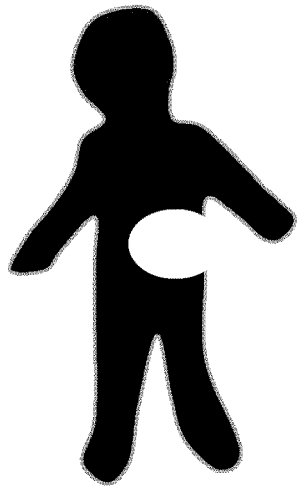
FIGS. 5A through 5C are diagrams illustrating an example of a processing result.
Figure 5B:
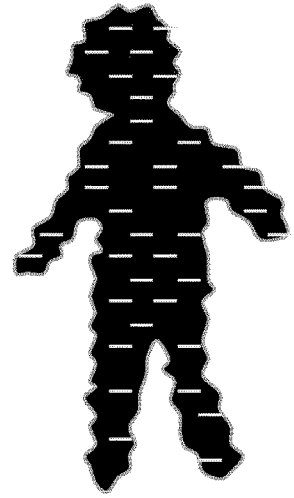
Figure 5C:
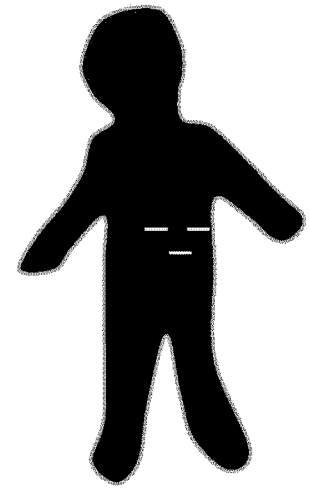

FIGS. 5A through 5C are diagrams illustrating an example of a foreground area. In FIGS. 5A through 5C, the black part indicates a foreground. FIG. 5A is a diagram illustrating an example of a processing result of the luminance foreground area estimating unit 310. In FIG. 5A, there is a defect in a part of the human figure. In a case where there is a portion of which the difference in luminance between the frame image and the background image is small, such a phenomenon with a defective portion as illustrated in FIG. 5A occurs. The image indicating the foreground area estimated by the luminance foreground area estimating unit 310 is output to the foreground area determining unit 313.

In S407, the threshold value determining unit 311 determines a threshold value for checking a difference in hue based on saturation information output from the first saturation information obtaining unit 306 and the second saturation information obtaining unit 309. Then, the threshold value determining unit 311 outputs the determined threshold value to the hue foreground area estimating unit 312. In the present embodiment, the threshold value determining unit 311 retains a table for determining the threshold value corresponding to saturation. The threshold value determining unit 311 determines the threshold value by referring to the table. For example, firstly, the threshold value determining unit 311 determines the threshold value by referring to the table, based on the smaller value of the S components of the frame image and the background image. This table is preset so that the threshold value becomes greater as the value of the S component is smaller. The lower the saturation (S component) is, the lower the accuracy of the hue (H component) becomes. Therefore, by making the threshold value for determining a foreground greater as the saturation (S component) is lower, it is made difficult to estimate a foreground area in a case where the hue accuracy decreases due to low saturation. Thereby, it is possible to prevent occurrence of erroneous determination. Contrarily, the greater the saturation (S component) is, the higher the accuracy of the hue (H component) becomes. Therefore, by making the threshold value for determining a foreground smaller as the saturation (S component) is higher, it is made easy to determine a foreground by use of a difference in hue in a case of high saturation.

In S408, the hue foreground area estimating unit 312 performs processing of estimating a foreground area by use of hue information output from the first hue information obtaining unit 305 and the second hue information obtaining unit 308 as well as the threshold value output from the threshold value determining unit 311. The hue foreground area estimating unit 312 calculates a difference value between an H component of the frame image and an H component of the background image and compares the difference value with the threshold value. In a case where the difference value is greater than the threshold value, the hue foreground area estimating unit 312 estimates that the pixel is the foreground. Here, the hue foreground area estimating unit 312 may calculate a difference between an S component of the frame image and an S component of the background image and, in a case where the difference is greater than a second threshold value, the hue foreground area estimating unit 312 may estimate that the pixel is the foreground. That is, in a case where a difference value in hue is greater than the predetermined threshold value and a difference in saturation is greater than the second threshold value, the pixel may be determined as the foreground. Alternatively, even though a difference value in hue is greater than the predetermined threshold value, in a case where the value of the S component of the frame image and the value of the S component of the background image are both smaller than a third threshold value, processing of not estimating to be the foreground may be performed.

In a case where above processing is performed with all pixels as a processing target pixel, an image representing the foreground area estimated based on hue information is completed. This processing is executed separately for each pixel as described above. For this reason, fine pixel defects may occur inside the area that should be the foreground, or fine noise may occur in the area that should be the background. Therefore, for example, a process of removing defects or noise by performing a smoothing process to an image indicating a foreground area may be performed. The image indicating the foreground area estimated by the hue foreground area estimating unit 312 is output to the foreground area determining unit 313.

FIG. 5B is a diagram illustrating an example of a processing result of the hue foreground area estimating unit 312. In a result of the estimation processing of a foreground area based on hue information, there is often a tendency that fine noise occurs inside the foreground area or the accuracy of the foreground boundary becomes lower.

In S409, the foreground area determining unit 313 combines an image indicating a foreground area, which are output from the luminance foreground area estimating unit 310 with an image indicating a foreground area, which are output from the hue foreground area estimating unit 312, by performing logical sum (OR) operation for each pixel, so as to determine the foreground area. Not limited to OR operation for both of the images, the foreground area determining unit 313 may perform other logical operations and various other processes.

FIG. 5C is a diagram illustrating an example of an operation result corresponding to the processing result of the luminance foreground area estimating unit 310 (c.f., FIG. 5A) and the processing result of the hue foreground area estimating unit 312 (c.f., FIG. 5B). It can be seen that the foreground area is improved as the defective portion of the human figure generated by estimation by use of luminance is complemented with estimation by use of hue. The image data indicating the foreground area determined by the foreground area determining unit 313 is output to the virtual viewpoint image generating unit 314.

In S410, the virtual viewpoint image generating unit 314 generates a virtual viewpoint image according to a virtual viewpoint position, which is input by user designation or the like. As a method for generating a virtual viewpoint image, a method such as Visual Hull is known, for example. The virtual viewpoint image generating unit 314 firstly generates a background of the virtual viewpoint by performing re-projection onto the two dimensions by use of the background image data, which is output from the background generating unit 303. Further, the virtual viewpoint image generating unit 314 restores the three-dimensional shape of each foreground based on image data indicating a foreground area of each camera, which is output from the foreground area determining unit 313. The virtual viewpoint image generating unit 314 generates a virtual viewpoint image by associating an image corresponding to the foreground with a three-dimensional model and then performing re-projection onto the two dimensions. Since Visual Hull is a well-known method, a detailed explanation thereof is omitted.

As described above, in the present embodiment, processing of estimating a foreground based on color information and processing of estimating a foreground based on luminance information are performed in the HSV color space. That is, processing of estimating a foreground is performed in two stages. Then, a foreground area is determined by performing a predetermined operation to the result of each processing of estimating a foreground. In the present embodiment, in the processing of estimating a foreground based on color information, a threshold value is provided for each pixel instead of providing a threshold value for the entire image. Further, the processing of changing the threshold value provided for each pixel according to the saturation of each pixel is performed. According to such processing, the threshold value is adaptively changed according to the saturation of each pixel. Therefore, for example, even though the hue accuracy becomes lower in a case of low saturation, it is possible to prevent occurrence of erroneous determination.

Although, in the processing of estimating a foreground based on luminance information, an description is given of an example in which the same threshold value is used for each pixel without changing the threshold value for each pixel, a threshold value may be provided for each pixel in the processing of estimating a foreground based on luminance information as well.

Furthermore, in the flowchart of FIG. 4, the example in which the processing of obtaining luminance information is performed prior to the processing of obtaining saturation information and the processing of obtaining hue information. However, the order is not limited thereto. Moreover, although the example in which the estimation processing of a foreground based on hue is performed after the estimation processing of a foreground based on luminance has been described, the processing may be performed in the reversed order.

Second Embodiment

In the first embodiment, the processing of estimating a foreground area in the HSV color space has been explained as processing of estimating a foreground based on color information. In the present embodiment, an example of estimating a foreground area in the Lab color space is explained as the processing of estimating a foreground based on color information.

Since the configuration of the image processing system in the present embodiment is the same as that in the first embodiment, explanation thereof is omitted.

Figure 6:
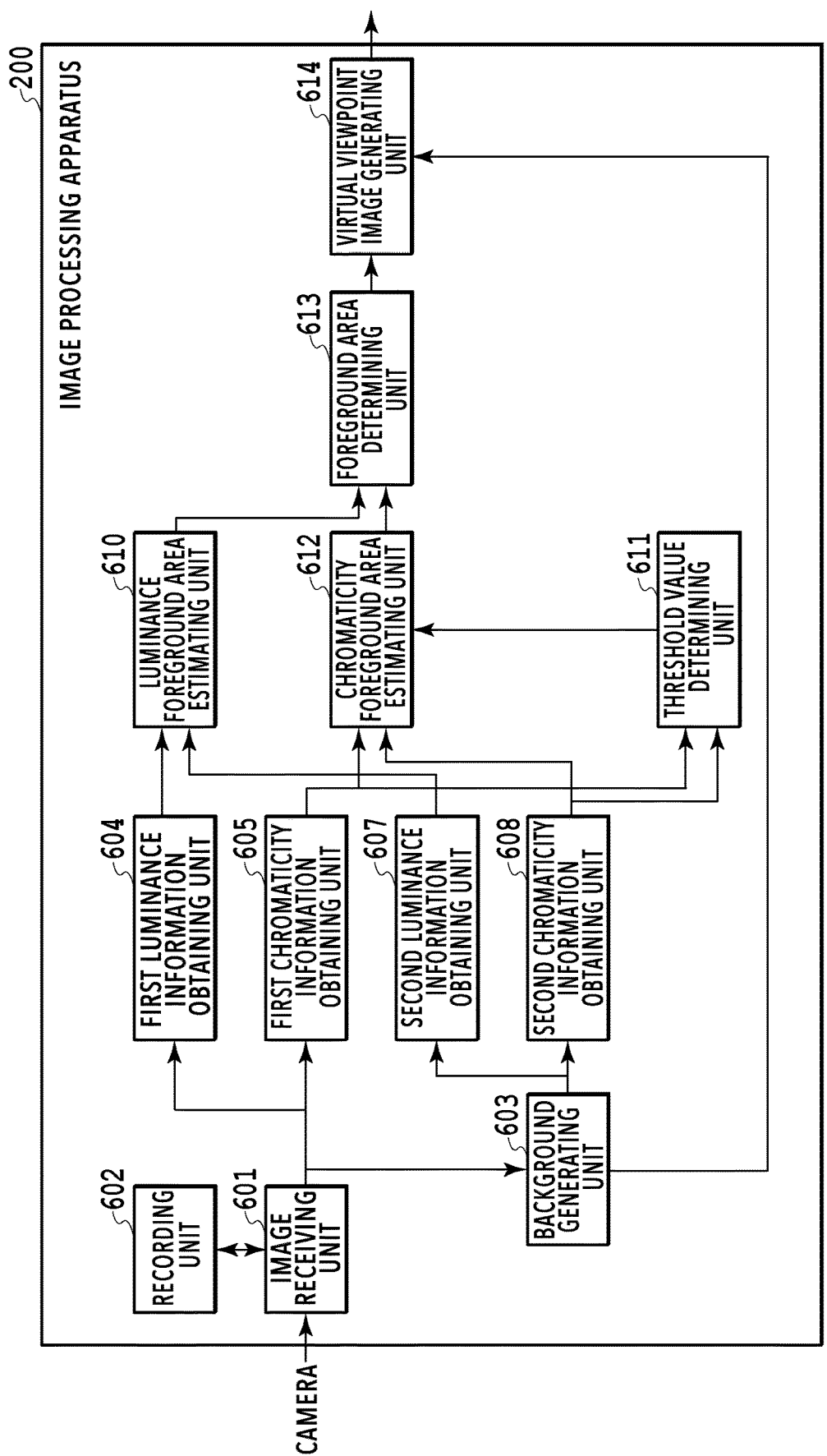
FIG. 6 is a block diagram illustrating a functional configuration of the image processing apparatus.

FIG. 6 is a block diagram illustrating a functional configuration of the image processing apparatus 200 of the present embodiment. The image processing apparatus 200 in the present embodiment includes an image receiving unit 601, a recording unit 602, a background generating unit 603, a first luminance information obtaining unit 604, a first chromaticity information obtaining unit 605, a second luminance information obtaining unit 607, a second chromaticity information obtaining unit 608, a luminance foreground area estimating unit 610, a threshold value determining unit 611, a chromaticity foreground area estimating unit 612, a foreground area determining unit 613, and a virtual viewpoint image generating unit 614.

The recording unit 602 in FIG. 6 is realized by the HDD 204 or the RAM 202, for example. Regarding the other units of FIG. 6, there may be a mode in which the CPU 201 reads out a program stored in the ROM 203, or the like, to the RAM 202 and executes the program, so that the CPU 201 functions as each unit illustrated in FIG. 6. Alternatively, the image processing apparatus 200 may include built-in hardware such as an ASIC or an FPGA, which is not illustrated in FIG. 6. Furthermore, each unit illustrated in FIG. 6 may be processed by hardware such as an ASIC and an FPGA, and each unit illustrated in FIG. 6 may be mounted inside an ASIC or an FPGA as hardware. Further, a part of FIG. 6 may be realized by software, and the rest may be realized by hardware.

Figure 7:
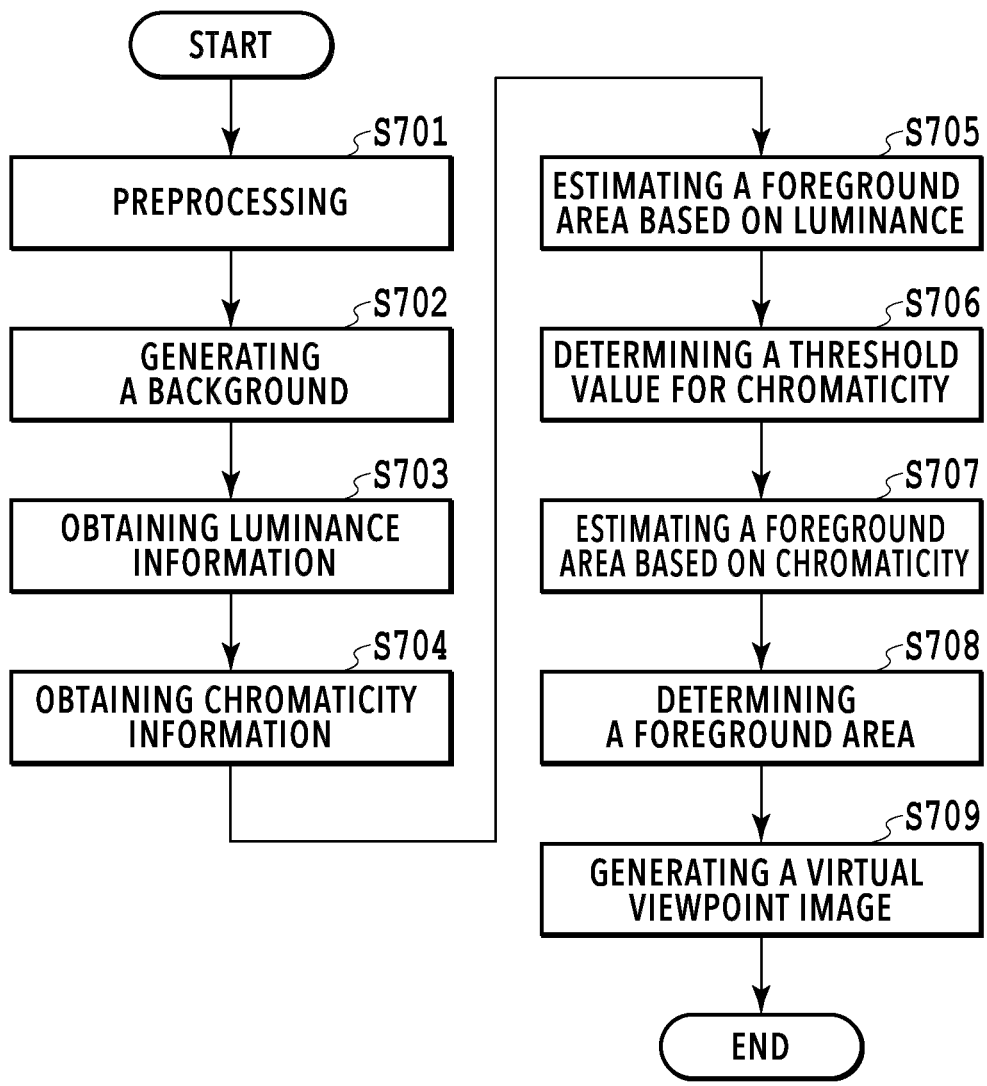
FIG. 7 is a flowchart for explaining image processing.

FIG. 7 is a diagram illustrating an example of a flowchart performed in the image processing apparatus 200. In S701, the image processing apparatus 200 performs preprocessing. Since the preprocessing is the same as the processing explained in the first embodiment, the explanation thereof is omitted.

In S702, the image processing apparatus 200 performs generation processing of a background image. Since the generation processing of a background image is the same as the processing explained in the first embodiment, the explanation thereof is omitted. The image receiving unit 601 outputs a frame image to the first luminance information obtaining unit 604, the first chromaticity information obtaining unit 605, and the background image generating unit 603. Further, the background image data generated by the background generating unit 603 is output to the second luminance information obtaining unit 607, the second chromaticity information obtaining unit 608, and the virtual viewpoint image generating unit 614.

In S703, processing of obtaining luminance information is performed by the first luminance information obtaining unit 604 and the second luminance information obtaining unit 607. In the present embodiment, a frame image is an image of which each pixel is configured with RGB pixel values, and the processing of obtaining luminance information is performed by calculating luminance information from the RGB pixel values. In a case where an image to which color conversion processing has already been performed is received by the image processing apparatus 200, the luminance information of the received image may be obtained without performing the calculation process. The same applies to chromaticity, which is described later.

First, an explanation is given of processing by the first luminance information obtaining unit 604. The first luminance information obtaining unit 604 determines luminance information of each pixel of a frame image that is output from the image receiving unit 601. In the present embodiment, processing by use of the Lab color space is performed to a frame image, which is an RGB image. Since calculation formulas for an "L component", an "a component", and a "b component" are generally known, a detailed explanation thereof are omitted. The first luminance information obtaining unit 604 calculates an L component, which is luminance information, from a frame image. Similarly, the second luminance information obtaining unit 607 calculates an L component, which is luminance information, from a background image.

In S704, processing of obtaining chromaticity information is performed by the first chromaticity information obtaining unit 605 and the second chromaticity information obtaining unit 608. The first chromaticity information obtaining unit 605 calculates an "a component" and a "b component", which indicate chromaticity corresponding to saturation information and hue information of each pixel of the frame image, which is output from the image receiving unit 601. Similarly, the second chromaticity information obtaining unit 608 calculates an "a component" and a "b component"

of each pixel of the background image, which is output from the background generating unit 603.

In S705, the luminance foreground area estimating unit 610 estimates a foreground area of the frame image by use of the luminance information of the frame image and the luminance information of the background image, which are obtained in S703. For example, the luminance foreground area estimating unit 610 checks the difference between the L components of the frame image and the background image, and, in a case where the value thereof is greater than a predetermined threshold value, the luminance foreground area estimating unit 610 estimates that the pixel is the foreground.

In S706, the threshold value determining unit 611 determines a threshold value for checking difference in chromaticity based on chromaticity information output from the first chromaticity information obtaining unit 605 and the second chromaticity information obtaining unit 608. Then, the threshold value determining unit 611 outputs the determined threshold value to the chromaticity foreground area estimating unit 612. First, the threshold value determining unit 611 calculates saturation "S" of the frame image and the background image by Formula (7).

$$S=\text{sqrt}(a^2+b^{\wedge}e2) \quad \text{Formula (7)}$$

Here, "sqrt" is a function for obtaining a square root, and "^" is a symbol representing a power. The threshold value determining unit 611 determines the threshold value by referring to a table, based on the smaller value of S components of the frame image and the background image. This table is preset so that the threshold value becomes greater as the value of the S component is smaller. Therefore, by making the threshold value for determining a foreground greater to attend to the chromaticity accuracy which decreases as the saturation (S component) is lower, it is possible to prevent occurrence of erroneous determination in a case where the chromaticity accuracy decreases due to low saturation. The threshold value determining unit 611 determines a threshold value for each pixel and outputs the determined threshold value to the chromaticity foreground area estimating unit 612.

In S707, the chromaticity foreground area estimating unit 612 performs processing of estimating a foreground area by use of chromaticity information output from the first chromaticity information obtaining unit 605 and the second chromaticity information obtaining unit 608 as well as the threshold value output from the threshold value determining unit 611. The chromaticity foreground area estimating unit 612 calculates a difference value between chromaticity of the frame image and chromaticity of the background image and compares the difference value with the threshold value. In a case where the difference value is greater than the threshold value, the chromaticity foreground area estimating unit 612 estimates that the pixel is a foreground. In a case of performing the above processing to all pixels, an image representing the foreground area estimated based on chromaticity information is completed. The image indicating the foreground area estimated by the chromaticity foreground area estimating unit 612 is output to the foreground area determining unit 613.

In S708, the foreground area determining unit 613 combines an image indicating a foreground area, which are output from the luminance foreground area estimating unit 610 with an image indicating a foreground area, which are output from the chromaticity foreground area estimating unit 612, by performing OR operation for each pixel, so as to determine the foreground area. In this way, as in the first embodiment, a foreground shape is improved by complementing a defective portion, etc., of a human figure, which is estimated as the foreground based on luminance, by use of the result of estimation of the foreground based on chromaticity. The image data indicating the foreground area determined by the foreground area determining unit 613 is output to the virtual viewpoint image generating unit 614.

In S709, the virtual viewpoint image generating unit 614 generates a virtual viewpoint image. Since the generation processing of a virtual viewpoint image is the same as the processing explained in the first embodiment, the explanation thereof is omitted.

As explained above, in the present embodiment, processing of estimating a foreground based on color information and processing of estimating a foreground based on luminance information are performed in the Lab color space. Then, a foreground area is determined by performing a predetermined operation to the result of each processing of estimating a foreground. In the present embodiment, as with the first embodiment, in the processing of estimating a foreground based on color information, a threshold value is provided for each pixel instead of providing a threshold value for the entire image. Further, the processing of changing the threshold value provided for each pixel according to the saturation of each pixel is performed. According to such processing, the threshold value is adaptively changed according to the saturation of each pixel. Therefore, for example, even though the chromaticity accuracy decreases in a case of low saturation, it is possible to prevent occurrence of erroneous determination.

As a difference between characteristic amounts of color, a method using color difference ΔE in the Lab color space may be performed, for example. However, color difference ΔE is an evaluation value including luminance and color. For this reason, it is not possible to perform adaptive control to attend to the change in the accuracy of color information depending on saturation. In the present embodiment, it is possible to prevent erroneous determination by changing a threshold value for comparing a chromaticity difference in the Lab color space according to saturation.

Other Embodiments

In the above-described embodiments, an explanation has been given with an example in which the processing of estimating a foreground based on color information and the processing of estimating a foreground based on luminance information are respectively performed, and, based on the results thereof, a result of the processing of estimating a foreground is determined. However, the embodiments are not limited to this example. There may be a mode in which, as processing of estimating a foreground, the processing of estimating a foreground based on color information and the processing of estimating a foreground based on luminance information are collectively performed.

Further, in the above-described embodiments, a mode in which a threshold value is changed for each pixel according to saturation is taken as an example for the explanation. However, the embodiments are not limited to this example. Instead of changing the threshold value for each pixel, it is possible to correct hue or chromaticity, which is to be compared with the threshold value, by weighting according to saturation, so as to compare the corrected value with the threshold value for each pixel. The corrected value is a value that is temporarily used for processing of estimating a foreground. With such processing, it is possible to obtain the same effect as in the above-described embodiments as well.

Further, in the above-described embodiments, a mode in which a threshold value corresponding to the smaller value of S components of a frame image and a background image is determined by referring to a table is taken as an example for explanation. However, the embodiments are not limited thereto. For example, in a case where the difference between saturation Sf of a frame image and saturation Sb of a background image is within a predetermined range, it is possible to determine a threshold value corresponding to a given value between saturation Sf and saturation Sb, such as the average value of saturation Sf and saturation Sb. That is, even with a threshold value corresponding to a value more or less shifted from S components of a frame image and a background image, the same effect can be obtained.

Further, in the above-described embodiments, for convenience of explanation, an explanation is given of an example in which the luminance information obtaining unit, the hue information obtaining unit, the saturation information obtaining unit, and the chromaticity information obtaining unit are configured for a frame image and for a background image, respectively. However, the embodiments are not limited thereto. Each information obtaining unit may be configured as the same obtaining unit for a frame image and a background image.

Further, in the above-described embodiments, an explanation has been given of a mode in which information such as luminance, saturation, hue, and chromaticity is used as a value for a color attribute of each pixel of an image. However, the embodiments are not limited thereto. Any mode may be possible as long as a value indicating a color attribute of each pixel of an image is used. Further, it is possible to estimate a first foreground area by comparing a difference value of values of a first attribute with a threshold value that is changed according to a value of a second attribute for each pixel and estimate a second foreground area by comparing a difference value of a third attribute with a threshold value that is the same for every pixel. Then, it is possible to determine a foreground area based on the first foreground area and the second foreground area.

Further, in the above-described embodiments, the processing of determining a foreground area in order to generate a virtual viewpoint image is taken as an example for explanation. However, the embodiments are not limited thereto. For example, it is possible to apply the embodiments to processing of determining a foreground area from a captured image obtained by a single camera such as a monitoring camera.

Although examples of an embodiment have been described in detail above, it is possible that the present disclosure is provided in such a form of implementation as a system, an apparatus, a method, a program, or a recording medium (storage medium). Specifically, the embodiments may be applied to a system configured with multiple devices (for example, a host computer, an interface device, an image capturing device, a web application, etc.) or may be applied to an apparatus composed of a single device.

Further, in the above-described embodiments, an explanation is given of a mode in which one image processing apparatus 200 obtains image data from multiple cameras, so as to generate a background image for each camera and determine a foreground area. However, the embodiments are not limited to thereto. For example, there may be a mode in which hardware of each camera or an image processing apparatus associated with each camera has functions except for the function of the virtual viewpoint image generating unit. Further, there may be a mode in which images representing a background image and a foreground area may be generated on each camera side, and each of the generated data may be transmitted to a device that generates a virtual viewpoint image.

Further, in the first embodiment, an explanation is given of the processing of estimating a foreground area using hue, and, in the second embodiment, an explanation is given of the processing of estimating a foreground area using chromaticity. It is possible to adopt an embodiment in which the above processing are combined. That is, both of the processing of estimating a foreground area using hue and the processing of estimating a foreground area using chromaticity may be performed. Then, a predetermined operation may be performed to each of the estimated foreground areas, so as to determine a foreground area estimated by use of the color information. That is, it is possible to adopt a mode in which at least one of the processing of estimating a foreground area using hue and the processing of estimating a foreground area using chromaticity.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

According to the present disclosure, it is possible to appropriately determine a foreground area from a captured image.

This application claims the benefit of Japanese Patent Application No. 2018-209731, filed Nov. 7, 2018, which is hereby incorporated by reference wherein in its entirety.

What is claimed is:

1. An image processing apparatus comprising:
one or more memories storing instructions; and
one or more processors executing the instructions to:
obtain a captured image captured by an image capturing apparatus;
obtain a background image corresponding to the obtained captured image;

specify a difference in hue or a difference in chromaticity between the obtained captured image and the obtained background image;

specify at least one of saturation of the obtained captured image and saturation of the obtained background image; and determine a foreground area based on a threshold value set according to the specified saturation and the specified difference in hue or the specified difference in chromaticity.

2. The image processing apparatus according to claim 1, wherein, in a case where the specified difference in hue or the specified difference in chromaticity of a target pixel is greater than the threshold value, the target pixel is determined as a pixel of the foreground area.

3. The image processing apparatus according to claim 1, wherein the one or more processors further execute the instructions to set the threshold value in accordance with the specified saturation.

4. The image processing apparatus according to claim 3, wherein the threshold value is set such that the threshold value becomes greater in a case where the specified saturation corresponds to a first value, compared to a case where the specified saturation corresponds to a second value that is greater than the first value.

5. The image processing apparatus according to claim 1, wherein the difference in hue is specified.

6. The image processing apparatus according to claim 1, wherein the difference in chromaticity is specified, and
wherein the saturation of the captured image is specified based on chromaticity of the obtained captured image or the saturation of the background image is specified based on chromaticity of the obtained background image.

7. The image processing apparatus according to claim 2, wherein the saturation of the captured image and the saturation of the background image are specified, and
wherein the target pixel is not determined as a pixel of the foreground area in a case where a difference between the specified saturation of the obtained captured image and the specified saturation of the obtained background image is smaller than a second threshold value, regardless of the specified difference in hue or the specified difference in chromaticity.

8. The image processing apparatus according to claim 2, wherein the saturation of the captured image and the saturation of the background image are specified, and
wherein the target pixel is not determined as a pixel of the foreground area in a case where the specified saturation of the obtained captured image and the specified saturation of the obtained background image are both smaller than a third threshold value, regardless of the specified difference in hue or the specified difference in chromaticity.

9. The image processing apparatus according to claim 1, wherein the one or more processors further execute the instructions to:
specify a difference between luminance of the obtained captured image and the obtained background image;
determine a foreground area based on a fourth threshold value and the specified difference between the obtained luminance; and
specify a foreground area based on the foreground area determined based on the fourth threshold value and the specified difference between the obtained luminance and the foreground area determined based on the threshold value set according to the specified saturation and the specified difference in hue or the specified difference in chromaticity.

10. The image processing apparatus according to claim 9, wherein, in a case where the difference between the specified luminance of a target pixel is greater than the fourth threshold value, the target pixel is determined as a pixel of the foreground area.

11. The image processing apparatus according to claim 9, wherein the fourth threshold value corresponds to a same value for every pixel.

12. The image processing apparatus according to claim 9, wherein the foreground area is specified by obtaining a logical sum of the foreground area determined based on the fourth threshold value and the specified difference between the obtained luminance and the foreground area determined based on the threshold value set according to the specified saturation and the specified difference in hue or the specified difference in chromaticity.

13. The image processing apparatus according to claim 9, wherein the one or more processors further execute the instructions to generate a virtual viewpoint image based on the specified foreground area and the obtained background image.

14. An image processing method executable by a computer, the method comprising:
obtaining a captured image captured by an image capturing apparatus;
obtaining a background image corresponding to the obtained captured image;
specifying a difference in hue or a difference in chromaticity between the obtained captured image and the obtained background image;
specifying at least one of saturation of the obtained captured image and saturation of the obtained background image; and
determining a foreground area based on a threshold value set according to the specified saturation and the specified difference in hue or the specified difference in chromaticity.

15. A non-transitory computer readable storage medium storing a program which causes a computer to perform:
obtaining a captured image captured by an image capturing apparatus;
obtaining a background image corresponding to the obtained captured image;
specifying a difference in hue or a difference in chromaticity between the obtained captured image and the obtained background image;
specifying at least one of saturation of the obtained captured image and saturation of the obtained background image; and
determining a foreground area based on a threshold value set according to the specified saturation and the specified difference in hue or the specified difference in chromaticity.

* * * * *